April 12, 1960 J. M. ALVEY, JR., ET AL 2,932,380
CONVEYOR ASSEMBLY
Filed June 9, 1958 4 Sheets-Sheet 4
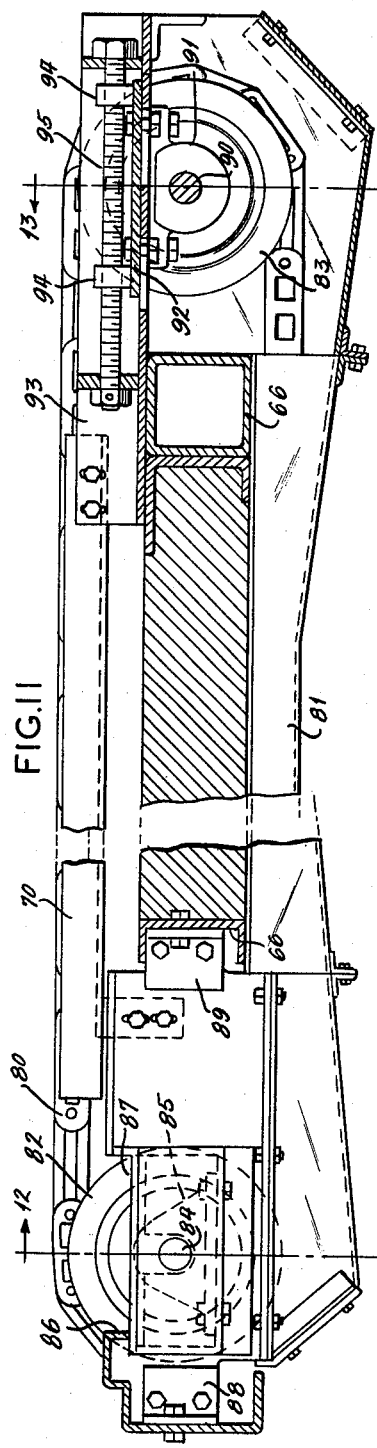
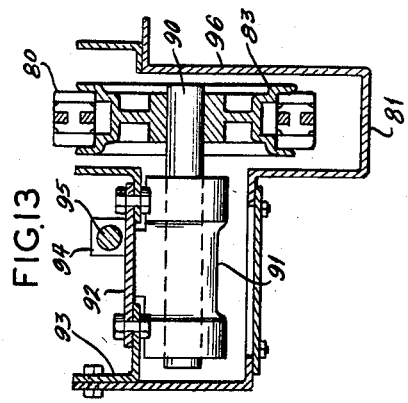
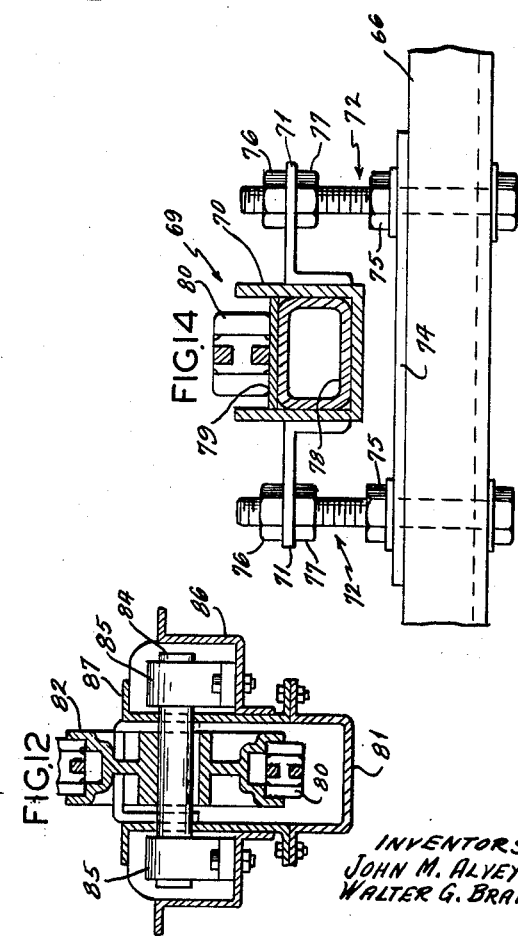
INVENTORS.
JOHN M. ALVEY JR.
WALTER G. BRAND JR.
By Gravely, Lieder & Woodruff
ATTORNEYS.

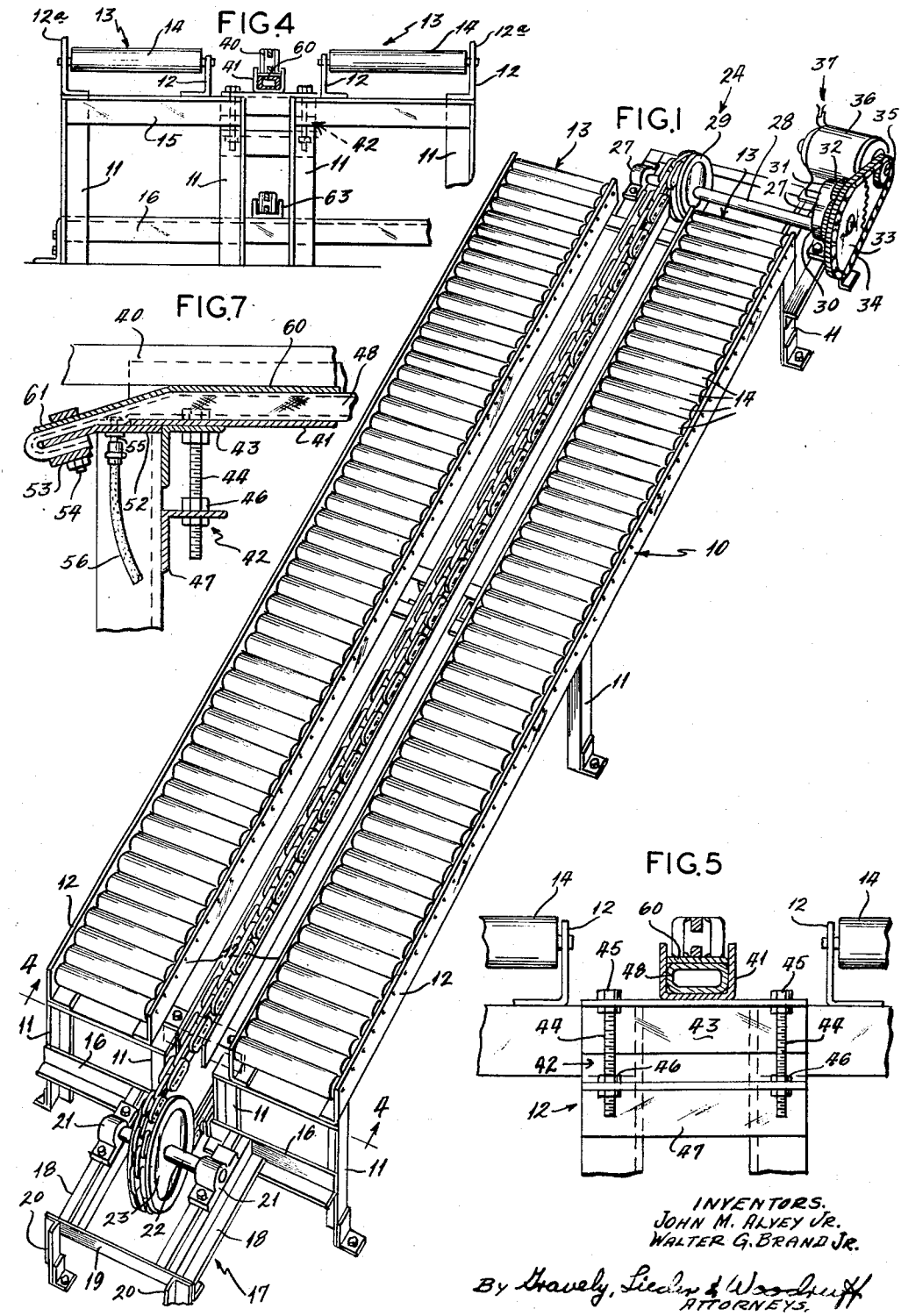

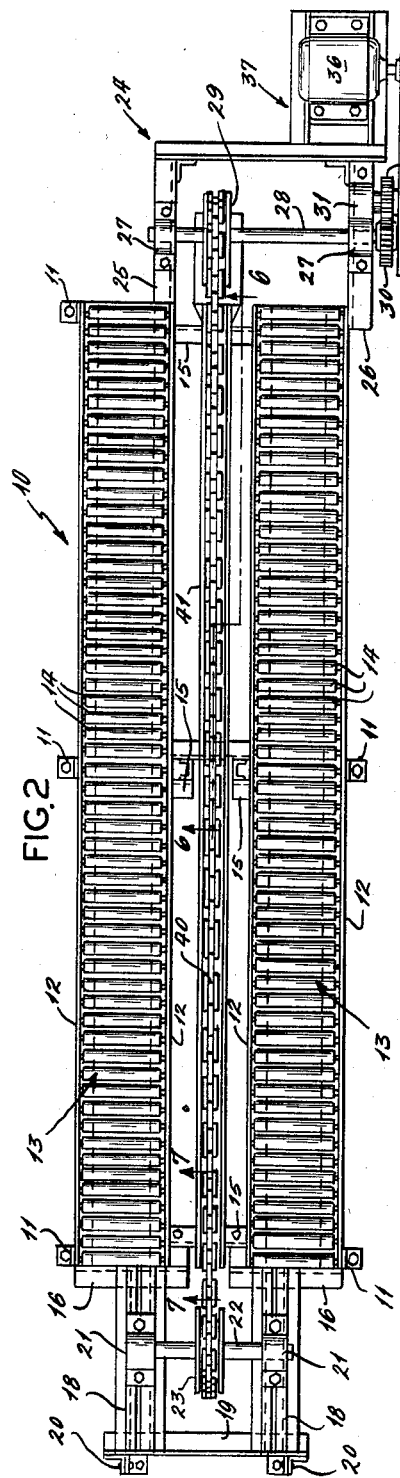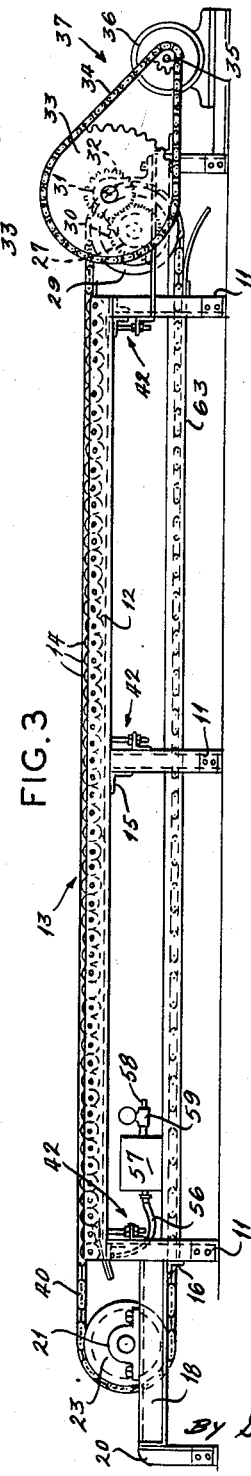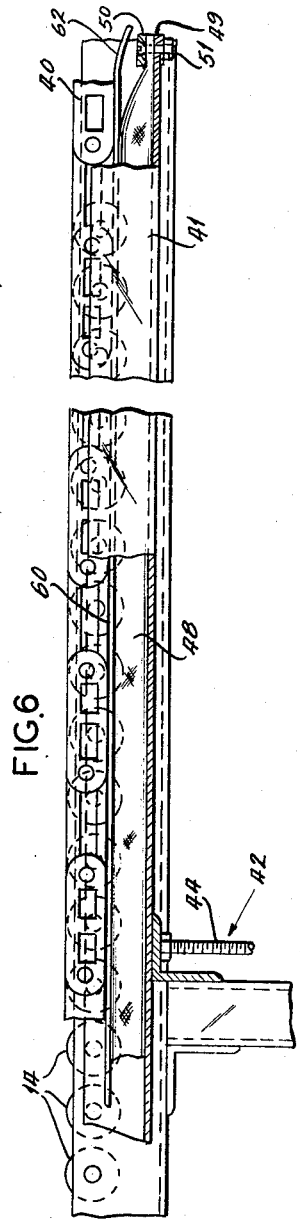

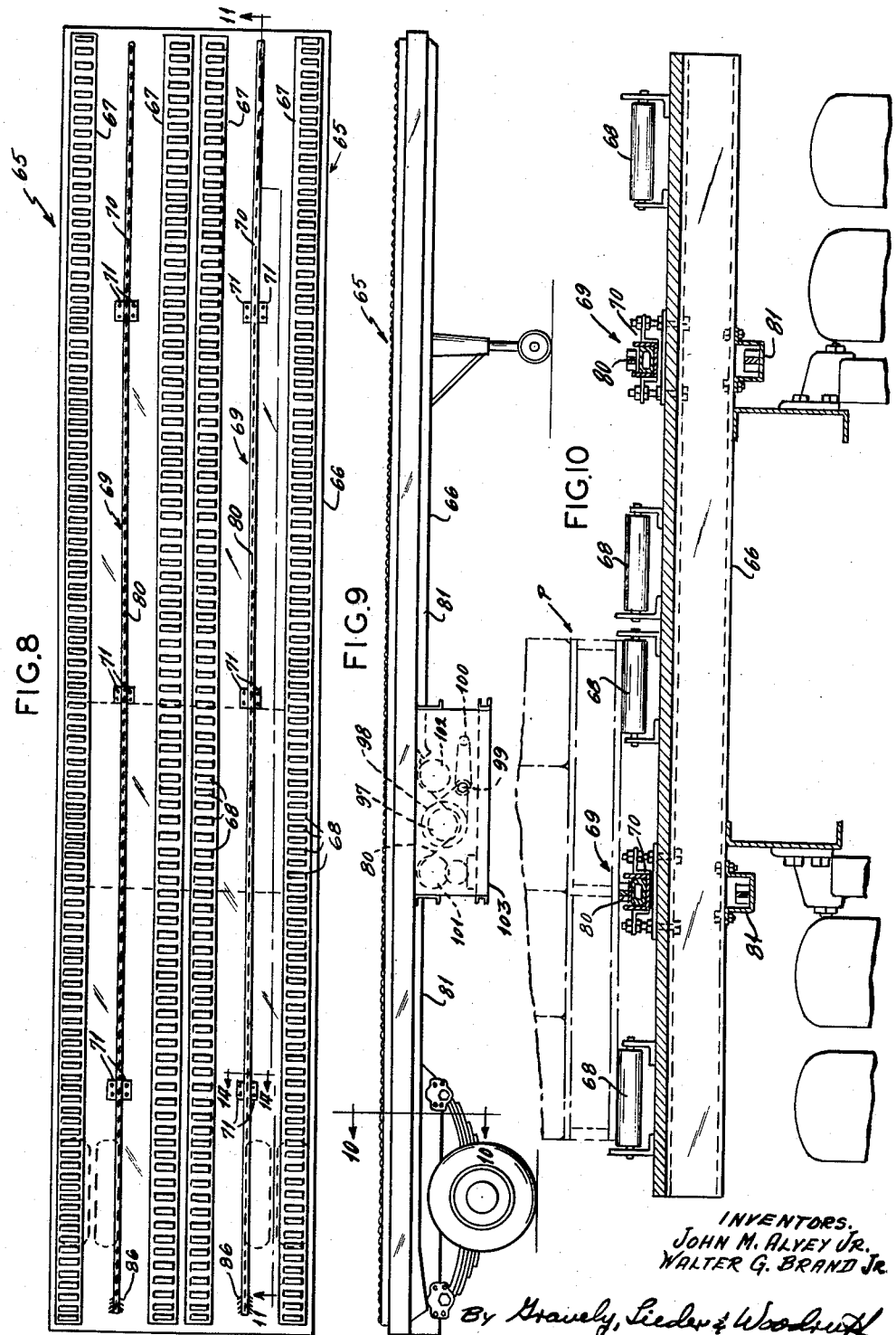

United States Patent Office 2,932,380
Patented Apr. 12, 1960

2,932,380
CONVEYOR ASSEMBLY
John M. Alvey, Jr., and Walter G. Brand, Jr., Kirkwood, Mo., assignors to Alvey Conveyor Manufacturing Co., St. Louis, Mo., a corporation of Missouri
Application June 9, 1958, Serial No. 740,702
4 Claims. (Cl. 198—162)

This invention relates to improvements in conveying apparatus for overcoming certain objections which have heretofore existed in conveyor appartus, and for increasing the number of applications where conveying apparatus can be of benefit.

It has long been known that if a positive powered conveyor is to be used as a hold over for palletized objects or other loads until it becomes convenient to remove the same, the power must be disconnected or stopped. On the other hand, in an indirect or friction conveyor it is only necessary that the drive impulse to the objects be interruped in someway. The first type fall into the class of stop and go conveyors which are of no concern here. The other type is of concern because it includes conveyors which depend upon friction between the object and the conveyor surface to generate the necessary drive impulse and yet, when an obstruction is encountered, the friction drive is overcome and the conveyor merely slides under the object. One known conveyor of the latter type embodies a friction chain drive supported by a plurality of coil springs to hold the chain against the object to be conveyed. A great amount of trouble is always encountered with such an assembly, because the springs individually have different characteristics and generate different friction forces along the length of the conveyor. Also, it is nearly impossible to obtain uniform spring adjustment. Furthermore, spring loaded conveyor chains are difficult to manufacture and are not entirely reliable.

There are other problems connected with conveyor apparatus of the type herein identified and it is an object of the present invention to overcome the problems which are known to exist and to provide a very simple device for readily obtaining friction drive on objects under conditions which will readily allow the objects to come to a stop without stopping or overloading the conveyor.

It is also an object of the invention to improve on conveyor apparatus to extend the usefulness thereof to not merely moving objects or loads, but to providing a conveyor which will function as a storage place.

It is a further object of the invention to construct a conveyor with drive means which is exceedingly simple and can readily produce varying degrees of drive with equal assurance that the adjustment will be substantially constant for long service periods.

The invention consists in the arrangement of an antifriction or free roller type gravity conveyor to support the greater part of the weight of an object, loaded pallet or the like, with an adjustable drive device in which a driving force on the thing being conveyed can be adjusted effect movement thereof, so long as there is no obstruction to its motion, but which device will not exert an unyielding drive so as to damage the load or cause the conveyor to stop. The invention further consists in the novel application of pneumatic or fluid pressurized and resilient means to support a conveyor drive device so that the difficulties heretofore existing in mechanical spring devices are overcome.

The invention may also consist in those parts, combination and sub-combination of parts, and improvements which are hereinafter set forth in connection with preferred apparatus, said apparatus being disclosed in the accompanying drawings, wherein:

Fig. 1 is a perspective view from the top of a conveyor apparatus embodying the improvements of this invention;

Fig. 2 is a top plan view of the conveyor apparatus of Fig. 1;

Fig. 3 is a longitudinal side view of the conveyor apparatus;

Fig. 4 is a fragmentary and partial sectional view of the conveyor apparatus as seen along line 4—4 in Fig. 1;

Fig. 5 is a greatly enlarged and fragmentary sectional view of the drive means incorporated in the conveyor apparatus of this invention;

Fig. 6 is an enlarged and fragmentary sectional view, in side elevation, of the apparatus as seen along line 6—6 in Fig. 2;

Fig. 7 is an enlarged and fragmentary sectional view of one end of the drive means forming this invention, and as seen along line 7—7 Fig. 2;

Fig. 8 is a top plan view of the bed of a vehicle provided with the present improvement;

Fig. 9 is a longitudinal side elevation of the vehicle bed seen in Fig. 8;

Fig. 10 is an enlarged and fragmentary sectional view taken at line 10—10 in Fig. 9;

Fig. 11 is a greatly enlarged sectional elevational view of parts of the front and rear portions of the conveyor construction see along line 11—11 in Fig. 8;

Figure 12 is a sectional detail taken at line 12—12 in Fig. 11;

Fig. 13 is a sectional detail taken at line 13—13 in Fig. 11; and

Fig. 14 is a sectional detail taken at line 14—14 in Fig. 8.

In the drawings, Figs. 1, 2 and 3 disclose one preferred conveyor assembly 10 of free standing type which is suitable for incorporation in many conveyor systems for horizontal and combined horizontal and vertical movement of objects. It is also particularly well adapted to be used with palletized objects which is a popular and economical method of handling commodities.

The conveyor assembly 10 has a frame consisting of legs 11 supporting sides 12 of parallel roller conveyor runs 13 in which free turning rolls 14 are mounted. The legs 11 are connected in groups (Fig. 4) by cross members 15 and 16 so that the assembly is simple and easy to fabricate. The roller runs 13 are spaced apart a suitable distance to carry the pallets or other objects, and the outer side angle members 12 extend well above the rolls 14 to form retaining curbs 12a for the objects.

One end of the assembly 10 is provided with a frame 17 having longitudinal members 18 extending from the adjacent cross members 16 to a cross member 19 supported on legs 20. The members 18 support bearing blocks 21 for a shaft 22 on which an idler wheel 23 is carried. The opposite end of the assembly 10 has a frame 24 with longitudinal members 25 and 26 supporting bearings 27 for a shaft 28 which carries a drive wheel 29 to cooperate with idler wheel 23 and a sprocket 30 at one end. A second bearing 31 on member 26 carries a shaft to support sprockets 32 and 33 of a speed reducing drive unit. The sprocket 33 is connected by chain 34 to the drive sprocket 35 on motor 36. Motor 36 is carried by the supporting frame assembly 37 (Fig. 2) attached to the frame 24.

The improved conveying device of this invention is operatively disposed in the space between the conveyor runs 13 and extends longitudinal between the wheels 23 and 29. As shown in Figs. 1, 2, 3, 5 and 6, a drag chain 40 is operatively carried on the sprocket wheels 23 and 29 and is driven from wheel 29. A chain supporting channel 41 extends the length of the assembly 10 to form a guide way and housing for certain parts to be described. The drag chain 40 is vertically adjustable relative to the supporting surfaces formed in the runs 13 by the rollers (see Figs. 4, 5 and 6), and the adjustment is obtained in two ways. First by the series of screw jacks 42 associated with the movably thrust brackets 43 fixed to and on which the guide way 41 is mounted. The screws 44 of the jacks (Fig. 5) when rotated by the wrench heads 45 turn in the fixed nuts 46 carried by the fixed brackets 47, thereby raising or lowering by brackets 43 and affecting the height of the drag chain guide way 41.

The second means of vertically adjusting the drag chain 40 (Figs. 5, 6 and 7) includes a pressure fluid container housed in the guide way 41 and consisting of an elongated, resilient wall tube 48 which is adapted to fill out the guide way 41 so that its elongated upper surface can be raised or lowered within the latter, depending upon the degree of pressure maintained in the tube. One end of the tube 48 (Fig. 6) is sealed in any suitable manner and is secured to the wall extension 49 of the guide way 41 by a clamp plate 50 and holding means 51. The opposite end of the tube 48 (Fig. 7) is also sealed in like manner and secured to an anchor bracket 52 carried by the bottom wall of the guide way 41. The securing of the tube is obtained by folding the end under the bracket 52 and clamping the same by a plate 53 and holding means 54. Pressure fluid supply for the tube 48 is provided at the nipple 55 through the hose 56 which leads to a supply reservoir 57 (Fig. 3). The pressure fluid is supplied to the reservoir at conduit 58 which may be connected to any suitable source such as a house supply (not necessary to show) or a motor driven compressor unit of any suitable known type and therefore not shown. A pressure control and gage device 59 is provided so that the reservoir may be maintained at the desired pressure reading, say 2 to 5 pounds per square inch.

The tube 48 is protected by a flexible wear strip 60 which rests upon the upper side to receive the drag chain 40. Strip 60 is anchored at end 61 (Fig. 7) to the bracket 52 by the means 54 while the opposite end 62 (Fig. 6) is curved down over the anchor plate 50 to form a protective portion to prevent the drag chain 40 from rubbing thereon. The return pass of drag chain 40 is controlled by a second guide way 63 (Figs. 3 and 4) carried by the cross members 16 of the supporting leg assemblies.

In operation, the conveyor apparatus of Fig. 1 is adapted to support the weight of a pallet P or other load upon the rollers 14 of the spaced roller runs 13 (see Fig. 10). Continuous travel of the drag chain 40 is obtained from motor 36 through the gear train and shaft 28 to drive wheel 29. If it is assumed that little or no pressure fluid is supplied to the resilient, expandable tube 48, the weight of the chain 40 and flexible scuff strip 60 will collapse the tube so that the upper face of the chain is below the level of the roller 14, whereupon no frictional contact can be obtained with the pallet P or load, and no movement thereof will result.

Initial vertical adjustment of the improved means is obtained by adjusting the screw jacks 42 to raise the drive assembly through the guide way channel 41 until the upper surface of the chain 40 coincides with the level of the rollers 14 (Fig. 3). Thereafter the reservoir 57 is pumped up or filled, together with the tube 48, so that the expansion of the tube elevates the scuff strip 60 and thereby raises the chain 40 to generate sufficient frictional drag contact under the pallet P or other load to cause it to travel along the conveyor runs 13. The degree of drag friction will not have to be excessive, but can be very accurately regulated at the control 59, and the pressure in the tube 48 will be the same along its entire length to produce a substantially uniform drag. The resilient strip 60 will flex sufficiently to permit the chain 40 to articulate freely, even over a length of two or three links, so that a considerable difference in chain elevation can be easily tolerated to take care of warped pallets or variations in shape of the load being handled by the conveyor. Moreover, as the chain wears and becomes smooth it is a very simple operation to increase the fluid pressure in tube 48 to compensate and restore the desired drag friction over the effective length of the conveyor assembly.

An advantage of the present invention lies in the pressure holding characteristic of tube 48 so that it may be inflated as desired and will retain the desired condition for long periods of time. Another advantage lies in the large combined volume of the reservoir and tube which aids in maintaining a uniform pressure, even when the conveyor is loaded throughout its length and tends to compress the tube 48. The reduction in volume in the tube 48 is small enough, in relation to the total volume of the combined tube and reservoir, to assure constant pressure within desired limits. A further important advantage of the invention is obtained in the operation of the conveyor as a storage unit during peak periods of use. The drag friction for moving a pallet P or other load on the rollers 14 can be quickly overcome should an obstruction be encountered, such as the pallet reaching a stop (not shown) at the end of the conveyor 10. At such times the chain 40 merely breaks away and slides under the pallet P and the drive motor 36 is not overloaded or strained. Subsequent pallets coming against the first one will also stop as the chain slides under so that the pressure of one or more subsequent pallets against the first pallet is kept very low and the motor 36 does not have to be stopped. Therefore, a group of pallets can be collected on the conveyor while the chain 40 is in continuous operation and the system will not be subject to overload as would be the case with positive drive systems of the stop and go type.

The present invention has may useful applications which will be appreciated from the foregoing description. One such application is illustrated in Figs. 8 to 14, inclusive, wherein a pair of conveyor assemblies 65 (Figs. 8, 9 and 10) are disposed on a vehicle trailer bed 66. The trailer is shown as an open flat bed, but it also might just as well be a closed, van type. In the drawings, the bed 66 carries spaced pairs of roller conveyor runs 67, each having free running rollers 68 to support the loaded pallets P. The improved drag chain device 69 of this invention is operatively disposed in the spaces between each pair of runs 67 to extend longitudinally of the bed 66. Since each device 69 is similar, a description of one will suffice for an understanding thereof.

As seen in Figs. 8, 10 and 14, the device includes a longitudinal guide way 70 in the form of an open channel. At spaced point, the channel is provided with angle brackets 71 to engage with screw jacks 72. Each jack includes a screw 73 passed upwardly in the bed 66 through a base plate 74 and held by a lock nut 75. The upper end of the jack screw is adjustably connected to the angle bracket 71 by means of a pair of nuts 76 and 77 which embrace the bracket and serve to permit vertical adjustment of the channel 70 relative to the trailer bed 66. The guide channel 70 supports an expandible tube 78 which is similar to tube 48 in Figs. 5, 6 and 7, and is sealed and secured at its ends in like manner. A flexible scuff strip 79 is placed on top of the tube 78, and this is also secured in position as shown in Fig. 7. A drag chain 80 is placed in position on the strip 79 and slides thereon while the conveyor is operating. The return pass of the chain 80 is run in a channel 81 secured beneath the trailer bed 66.

Referring to Figs. 11, 12 and 13, the drag chain 80 is led about a fixed idler sprocket wheel 82 at one end of the trailer bed 66 and over a second adjustable sprocket wheel 83 at the opposite end. The fixed wheel 83 is supported on a shaft 84 carried in suitable bearings 85 recessed in the bed 66 in a well 86. The bearings 85 are suitably mounted in a frame assembly 87, in turn, connected to the bed structure at brackets 88 and 89, as shown. The opposite wheel 83 is mounted on shaft 90 carried by bearings 91 secured to a movable slide 92 in a recessed frame 93 in the bed 66. The slide has spaced ears 94 to receive an adjusting screw 95, and the screw 95 rotates in the frame 93 without translation so that turning the screws 95 effects sliding movement of the slide 92, together with the shaft 90 and wheel 83. The foregoing assembly is housed in a well 96 in the bed 66.

In Fig. 9, the drag chain 80 has its return pass connected under the bed 66 to a drive sprocket wheel 97 which is driven by a sprocket wheel 98 chain connected to a speed reducer or power take-off unit 99. The unit 99 is driven by motor 100. The drag chain 80 passes over spaced idler wheels 101 and 102 which are aligned with the front and rear portions of the channel 81. The foregoing drag chain drive is housed in a suitable enclosed frame 103 suspended from the bed 66 in known manner in the vehicle art.

The operation of the conveyor apparatus just described is similar to that described for the apparatus of Fig. 1. It is not believed necessary to repeat the disclosure of the reservoir means 57 in Fig. 3 or the supply connection for pressure fluid of Fig. 7, since these portions are now understood in connection with the full disclosure afforded herein. It is deemed sufficient to point out, without showing the same, that the vehicle trailer may be provided with a compressor unit which will furnish a supply of pressure fluid for the purpose in view.

While certain embodiments of the invention have been disclosed above, it should now be obvious that the improvement may be adapted to other important applications and it is intended to cover all such applications that come within this invention without limitation, except as may be imposed by the appended claims.

What is claimed is:

1. In a conveyor apparatus, anti-friction load supporting means to carry the weight of the load to be conveyed, elongated load moving means disposed in a parallel path adjacent to said supporting means, said moving means comprising an endless articulated drag member having substantially planar surfaces for load moving contact with a load on said load supporting means, a resilient inflatable member forming an air cushion of predetermined uniform magnitude below said endless member, and scuff strip means disposed between said inflatable and endless members to absorb the rubbing and wear of the endless member, said scuff strip being fixed against movement along the path of said endless member.

2. In load conveying apparatus for a conveying system in which at least one object may be stored on the apparatus without stopping the apparatus or disconnecting the same, the improvement of anti-friction load supporting track means to support the objects of the load for travel along the apparatus substantially free of obstruction to conveyance, and load impelling means disposed along said track means including an endless chain providing a succession of upper, substantially co-planar faces for contact with the objects of the load being conveyed, drive means continuously moving said chain in a load impelling direction, a flexible wear plate slidably supporting said chain, and inflatable means supporting said wear plate and chain and being selectively pressurized to uniformly displace the faces of said chain toward the objects of the load and to adjust the surface contact pressure therebetween to a magnitude great enough to overcome the inertia of the mass of each object and frictionally move the object and low enough that relative frictional sliding movement of said chain under each object occurs when external obstruction to object movement is met, whereby leading objects acting as an obstruction to the conveyance of other objects will not overload the conveyor apparatus and stop normal movement of said chain.

3. In load conveying apparatus for conveying a series of objects in a load upon anti-friction means supporting the objects during movement between receiving and discharge stations and for holding the objects in storage on the anti-friction means without stopping the apparatus from conveying additional objects into the holding area occupied by preceding objects: the improvement of load moving means positioned adjacent to the anti-friction means, and drive means continuously driving said load moving means in a horizontal path between the stations; said load moving means including a fixed guide, a scuff member within said guide, an articulated chain movable in said guide and slidable over said scuff member and having a substantially smooth upper surface, said scuff member and chain being flexible to conform substantially to irregular surface characteristics of the objects being conveyed, and a yieldable and flexible walled container disposed within said guide and beneath said scuff member and extending between said receiving and discharge stations, said container being inflatable to different pressures for maintaining the upper surface of said chain uniformly against each of the objects in a load with surface engagement sufficient to frictionally move each object freely but insufficient to move the same in opposition to external forces producing resistance to the free movement of the object.

4. A conveyor apparatus for conveying a series of articles in a load in a path between receiving and discharge stations and for holding the articles in storage between said stations without stopping the apparatus from conveying additional articles into the holding area occupied by preceding articles, said apparatus comprising spaced rows of anti-friction rollers supporting the greater proportion of the weight of the articles in a load during movement from receiving to discharge stations of the apparatus and storage thereof, load moving means for contacting and moving articles on said rollers between said receiving and discharge stations, said load moving means including an endless articulated chain having substantially smooth and planar upper surfaces in a horizontal load-carrying path above said rollers and extending beyond the receiving and discharge stations of the rollers, drive means for continuously moving said chain in its load-carrying path, and adjustable and yieldable means for supporting said chain in its load-carrying path and exerting load-carrying force between the upper surfaces of said chain and articles positioned on the chain and rollers, said adjustable and yieldable means including a fixed chain guide channel and an elongated inflatable member positioned in said channel extending horizontally between said receiving and discharge stations below said chain, means for selectively pressurizing said inflatable member to yieldably exert an upward force on said chain to provide a uniform surface contact pressure between the upper surface of the chain and articles thereon at a magnitude great enough to overcome the inertia of the mass of each article and move the article, the magnitude of surface contact pressure being low enough to provide relative sliding movement of the chain under the article in the event external obstruction to article movement occurs, and a flexible wear plate covering said inflatable member and slidably receiving said chain thereon, one end of said wear plate being anchored to said channel and the rest of the wear plate being vertically movable responsive to changes in the magnitude of pressure of said inflatable member, and said chain and wear plate having sufficient weight to collapse said inflatable member to obtain immediate response to pressure changes in said inflatable member.

References Cited in the file of this patent

UNITED STATES PATENTS

| | | |
|---|---|---|
| 1,209,021 | Phillips | Dec. 19, 1916 |
| 1,523,988 | Vance | Jan. 20, 1925 |
| 1,857,566 | Perry | May 10, 1932 |
| 2,828,027 | Stevenson et al. | Mar. 25, 1958 |